United States Patent
Wu et al.

(10) Patent No.: US 7,236,460 B2
(45) Date of Patent: Jun. 26, 2007

(54) DETECTING A COUNTERFEIT ACCESS POINT IN A WIRELESS LOCAL AREA NETWORK

(75) Inventors: Miles Wu, Fremont, CA (US); Chia-Chee Kuan, Los Altos, CA (US); Dean Au, Sunnyvale, CA (US)

(73) Assignee: Airmagnet, Inc., Sunnyvale, CA (US)

( * ) Notice: Subject to any disclaimer, the term of this patent is extended or adjusted under 35 U.S.C. 154(b) by 1219 days.

(21) Appl. No.: 10/112,402

(22) Filed: Mar. 29, 2002

(65) Prior Publication Data
US 2003/0185244 A1 Oct. 2, 2003

(51) Int. Cl.
*H04L 12/22* (2006.01)

(52) U.S. Cl. .......................... 370/241; 370/338
(58) Field of Classification Search ............... 370/241, 370/252, 338
See application file for complete search history.

(56) References Cited

U.S. PATENT DOCUMENTS

| | | | |
|---|---|---|---|
| 6,188,681 B1 | 2/2001 | Vesuna | |
| 6,393,261 B1 | 5/2002 | Lewis | |
| 6,957,067 B1* | 10/2005 | Iyer et al. | 455/435.1 |
| 2005/0030929 A1* | 2/2005 | Swier et al. | 370/338 |
| 2005/0060576 A1* | 3/2005 | Kime et al. | 713/201 |

OTHER PUBLICATIONS

IBM Research News, 'IBM Research Demonstrates Industry's First Auditing Tool For Wireless Network Security', dated Jul. 12, 2001.*
Joshua Wright, 'Detecting Wireless LAN MAC Address Spoofing', XP-002330231, Jan. 21, 2003, pp. 1-20.*
Adya, A. et al, Architecture and Techniques for Diagnosing Faults in IEEE 802.11 Infrastructure Networks, Proceedings of the Tenth Annual International Conference on Mobile Computing and Networking, MobiCom 2004, Sep./Oct. 2004, pp. 1-15.*
International Preliminary Examination Report mailed on Dec. 18, 2003, for PCT patent application No. PCT/US03/09914 filed Mar. 28, 2003, 4 pages.

* cited by examiner

*Primary Examiner*—Melvin Marcelo
(74) *Attorney, Agent, or Firm*—Blakely, Sokoloff, Taylor & Zafman LLP (57) ABSTRACT

In a wireless local area network, beacon frames are transmitted over the wireless local area network by one or more access points. The beacon frames are received at a detector in the wireless local area network. The received beacon frames are analyzed at the detector to detect a counterfeit access point in the wireless local area network.

24 Claims, 7 Drawing Sheets

DETECTING A COUNTERFEIT ACCESS POINT IN A WIRELESS LOCAL AREA NETWORK

BACKGROUND

1. Field of the Invention

The present invention generally relates to wireless local area networks. More particularly, the present invention relates to detecting a counterfeit access point in a wireless local area network.

2. Description of the Related Art

Computers have traditionally communicated with each other through wired local area networks ("LANs"). However, with the increased demand for mobile computers such as laptops, personal digital assistants, and the like, wireless local area networks ("WLANs") have developed as a way for computers to communicate with each other through transmissions over a wireless medium using radio signals, infrared signals, and the like.

In order to promote interoperability of WLANs with each other and with wired LANs, the IEEE 802.11 standard was developed as an international standard for WLANs. Generally, the IEEE 802.11 standard was designed to present users with the same interface as an IEEE 802 wired LAN, while allowing data to be transported over a wireless medium.

Although WLANs provide users with increased mobility over wired LANs, the security of communications over a WLAN can vary for reasons that are not present in wired LANs. For instance, a counterfeit access can pose as an authorized access point in the WLAN. Stations in the WLAN can mistakenly associate with the counterfeit access point and can send confidential information to the counterfeit access point, without knowing that the counterfeit access point is unsecure. Consequently, the counterfeit access point can obtain confidential information from stations in the WLAN. Accordingly, the presence of a counterfeit access point can present security problems in a WLAN.

SUMMARY

In one embodiment of the present invention, a counterfeit access point in a wireless local area network is detected by receiving beacon frames at a detector in the wireless local area network, where the beacon frames are transmitted over the wireless local area network by one or more access points. The received beacon frames are analyzed at the detector to detect the counterfeit access point.

DESCRIPTION OF THE DRAWING FIGURES

The present invention can be best understood by reference to the following detailed description taken in conjunction with the accompanying drawing figures, in which like parts may be referred to by like numerals.

DETAILED DESCRIPTION

In order to provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

Figure 1:
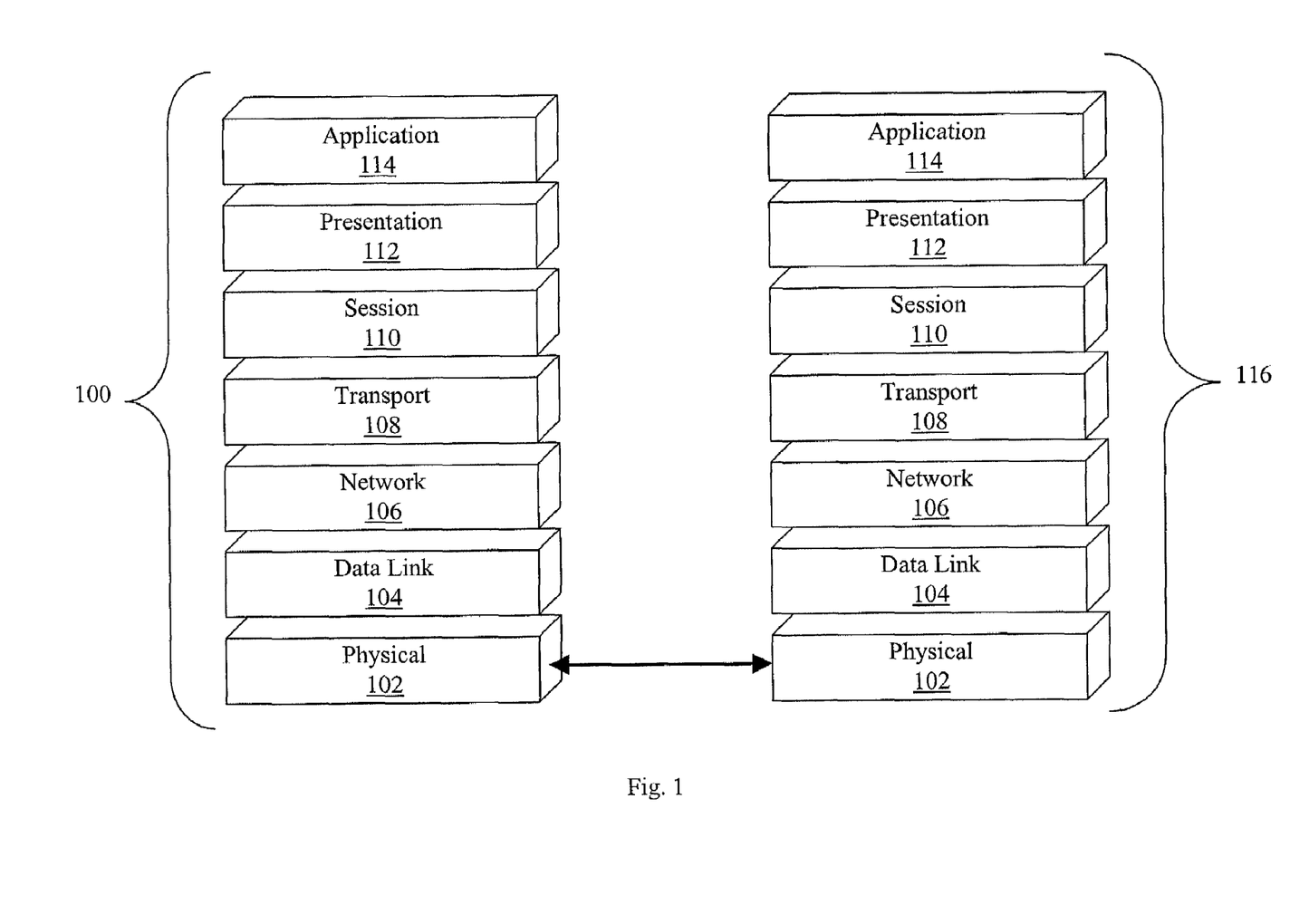
FIG. 1 shows an exemplary Open Systems Interconnection (OSI) seven layer model.

With reference to FIG. 1, an exemplary Open Systems Interconnection (OSI) seven layer model is shown, which represents an abstract model of a networking system divided into layers according to their respective functionalities. In particular, the seven layers include physical layer 102 corresponding to layer 1, data link layer 104 corresponding to layer 2, network layer 106 corresponding to layer 3, transport layer 108 corresponding to layer 4, session layer 110 corresponding to layer 5, presentation layer 112 corresponding to layer 6, and application layer 114 corresponding to layer 7. Each layer in the OSI model only interacts directly with the layer immediately above or below it, and different computers 100 and 116 can communicate directly with each other only at the physical layer 102. However, different computers 100 and 116 can effectively communicate at the same layer using common protocols. For example, in one exemplary embodiment, computer 100 can communicate with computer 116 at application layer 114 by propagating a frame from application layer 114 of computer 100 through each layer below it until the frame reaches physical layer 102. The frame can then be transmitted to physical layer 102 of computer 116 and propagated through each layer above physical layer 102 until the frame reaches application layer 114 of computer 116.

The IEEE 802.11 standard for wireless local area networks ("WLANs") operates at the data link layer 104, which corresponds to layer 2 of the OSI seven layer model, as described above. Because IEEE 802.11 operates at layer 2 of the OSI seven layer model, layers 3 and above can operate according to the same protocols used with IEEE 802 wired LANs. Furthermore, layers 3 and above can be unaware of the network actually transporting data at layers 2 and below. Accordingly, layers 3 and above can operate identically in the IEEE 802 wired LAN and the IEEE 802.11 WLAN. Furthermore, users can be presented with the same interface, regardless of whether a wired LAN or WLAN is used.

Figure 2:
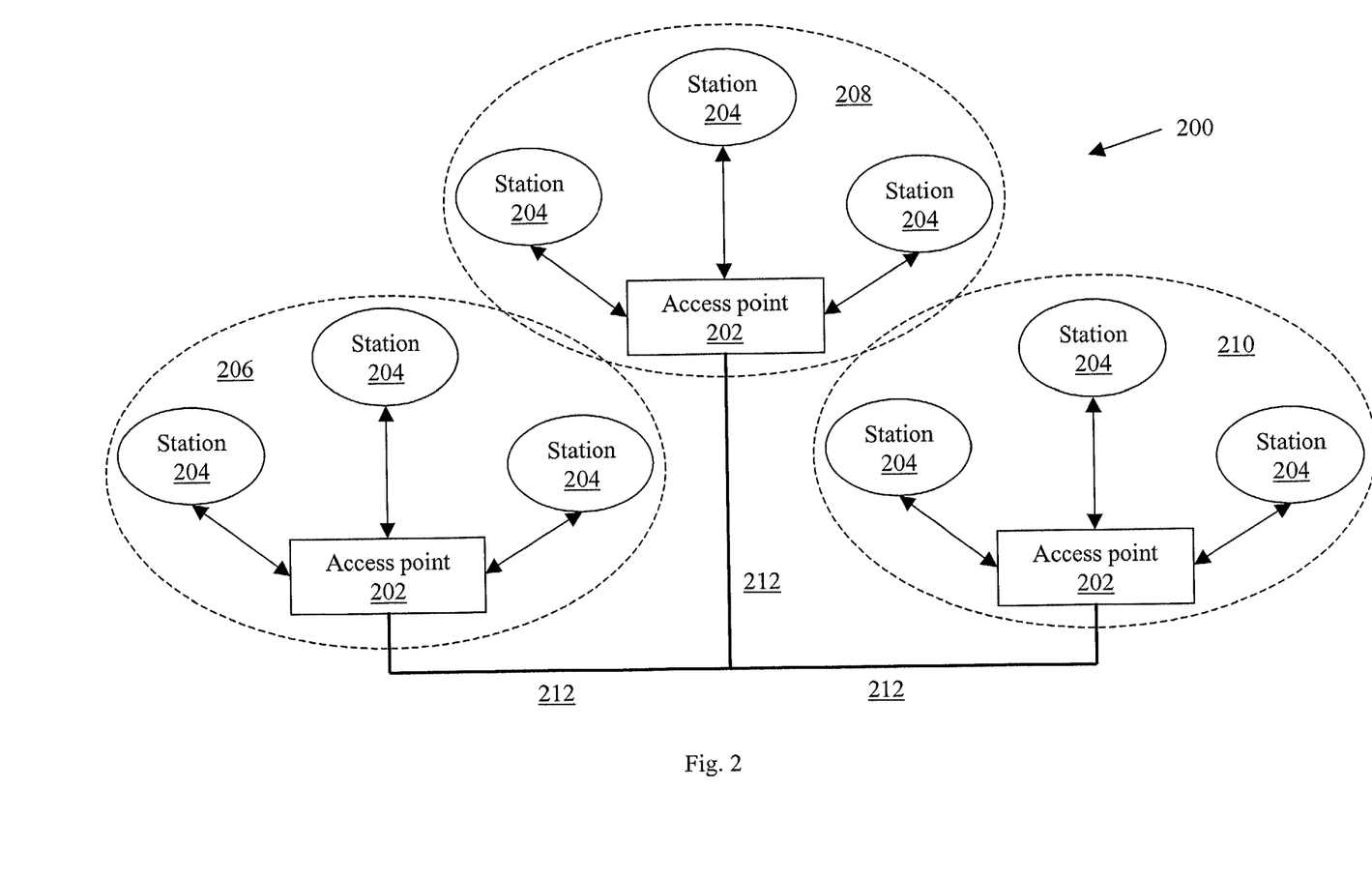
FIG. 2 shows an exemplary extended service set in a wireless local area network ("WLAN")

With reference to FIG. 2, an exemplary extended service set 200, which forms a WLAN according to the IEEE 802.11 standard, is depicted having basic service sets ("BSS") 206, 208, and 210. Each BSS can include an access point ("AP") 202 and stations 204. A station 204 is a component that can be used to connect to the WLAN, which can be mobile, portable, stationary, and the like, and can be referred to as the network adapter or network interface card. For instance, a station 204 can be a laptop computer, a personal digital assistant, and the like. In addition, a station 204 can support station services such as authentication, deauthentication, privacy, delivery of data, and the like.

Each station 204 can communicate directly with an AP 202 through an air link, such as by sending a radio or infrared signal between WLAN transmitters and receivers. Each AP 202 can support station services, as described above, and can additionally support distribution services, such as association, disassociation, distribution, integration, and the like. Accordingly, an AP 202 can communicate with stations 204 within its BSS 206, 208, and 210, and with other APs 202 through medium 212, called a distribution system, which forms the backbone of the WLAN. This distribution system 212 can include both wireless and wired connections.

Figure 3:
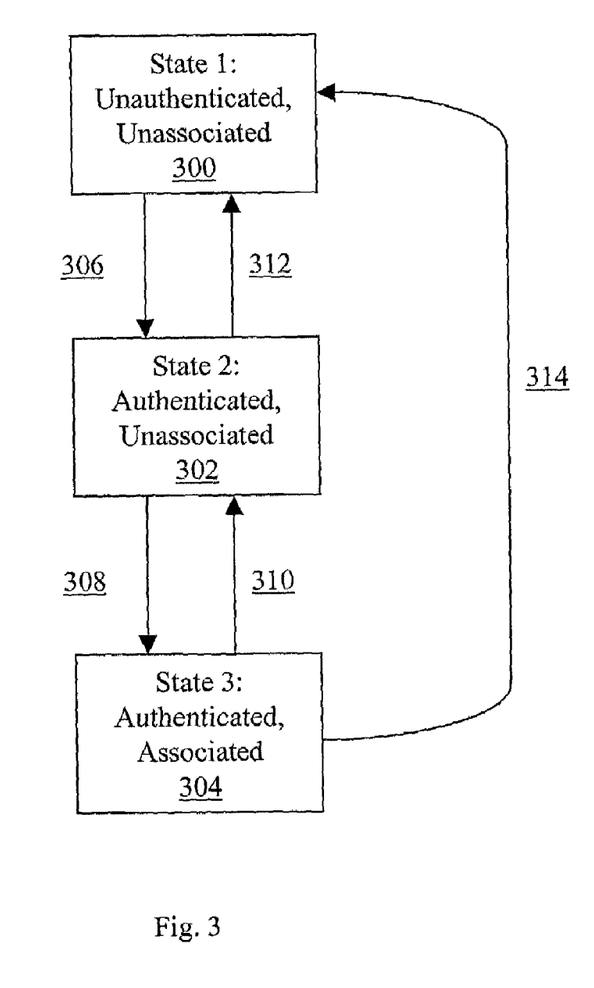
FIG. 3 is an exemplary flow diagram illustrating various states of stations in a WLAN.

With reference to FIGS. 2 and 3, under the current IEEE 802.11 standard, each station 204 must be authenticated to and associated with an AP 202 in order to become a part of a BSS 206, 208, or 210. Accordingly, with reference to FIG. 3, a station 204 begins in State 1 (300), where station 204 is unauthenticated to and unassociated with an AP 202. In State 1 (300), station 204 can only use a limited number of frame types, such as frame types that can allow station 204 to locate and authenticate to an AP 202, and the like.

If station 204 successfully authenticates 306 to an AP 202, then station 204 can be elevated to State 2 (302), where station 204 is authenticated to and unassociated with the AP 202. In State 2 (302), station 204 can use a limited number of frame types, such as frame types that can allow station 204 to associate with an AP 202, and the like.

If station 204 then successfully associates or reassociates 308 with AP 202, then station 204 can be elevated to State 3 (304), where station 204 is authenticated to and associated with AP 202. In State 3 (304), station 204 can use any frame types to communicate with AP 202 and other stations 204 in the WLAN. If station 204 receives a disassociation notification 310, then station 204 can be transitioned to State 2. Furthermore, if station 204 then receives deauthentication notification 312, then station 204 can be transitioned to State 1. Under the IEEE 802.11 standard, a station 204 can be authenticated to different APs 202 simultaneously, but can only be associated with one AP 202 at any time.

With reference again to FIG. 2, once a station 204 is authenticated to and associated with an AP 202, the station 204 can communicate with another station 204 in the WLAN. In particular, a station 204 can send a message having a source address, a basic service set identification address ("BSSID"), and a destination address, to its associated AP 202. The AP 202 can then distribute the message to the station 204 specified as the destination address in the message. This destination address can specify a station 204 in the same BSS 206, 208, or 210, or in another BSS 206, 208, or 210 that is linked to the AP 202 through distribution system 212.

Although FIG. 2 depicts an extended service set 200 having three BSSs 206, 208, and 210, each of which include three stations 204, it should be recognized that an extended service set 200 can include any number of BSSs 206, 208, and 210, which can include any number of stations 204.

Figure 4:
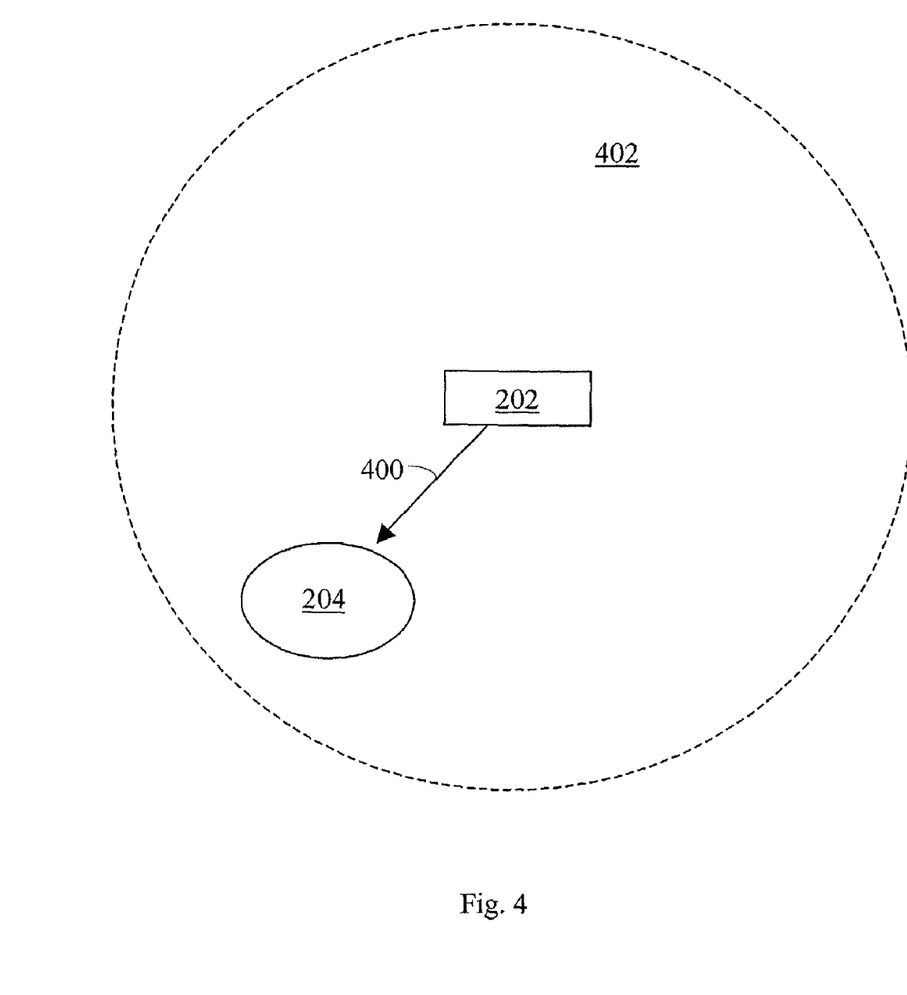
FIG. 4 shows an exemplary embodiment of an access point sending a beacon frame.

Under the current IEEE 802.11 standard, before a station 204 can associate with an AP 202, station 204 first locates the AP 202. With reference to FIG. 4, an exemplary system that can be used to locate an AP 202 using beacon frames in a WLAN is shown. More particularly, according to the current IEEE 802.11 standard, AP 202 can transmit beacon frames 400 across transmission range 402. Stations 204 located within transmission range 402 can detect beacon frames 400. In addition, stations 204 can use information in beacon frames 400 to locate AP 202's BSS 206, 208, or 210 (FIG. 2) at a later time.

Generally, beacon frames 400 can include information such as frame type, beacon frame interval/rate, sequence number, timestamp, capability information, SSID, supported rates, one or more PHY parameter sets, direct sequence (DS) parameter set, frequency hopping (FH) parameter set, and the like.

According to the current IEEE 802.11 standard, sending beacon frames 400 from AP 202 can be optional. However, some functionality in the WLAN can be lost if AP 202 does not send beacon frames 400. For instance, if AP 202 does not send beacon frames 400, station 204 may not be able to locate AP 202 by passively listening for signals from AP 202. Instead, station 204 can send a probe request to locate AP 202. However, more bandwidth and time can be required if each station 204 in the WLAN individually sends a probe request to locate AP 202. Furthermore, for roaming stations 204, if AP 202 does not send beacon frames 400 periodically, the roaming stations 204 can send probe requests periodically in order to locate the AP. However, periodically sending probe requests from these roaming stations 204 can consume even more bandwidth and time. In addition, if AP 202 does not send beacon frames 400 and station 204 does not send a probe request, then both station 204 and AP 202 can be unaware of the other. Accordingly, although sending beacon frames 400 from AP 202 can be optional, sending beacon frames 400 from AP 202 can improve the functionality of the WLAN.

However, sending beacon frames from APs in a WLAN can also compromise the security of communications over the WLAN. As noted earlier, WLANs can provide users with increased mobility, in comparison to wired LANs, but the security of communications over a WLAN can vary for reasons that are not present in wired LANs.

Figure 5:
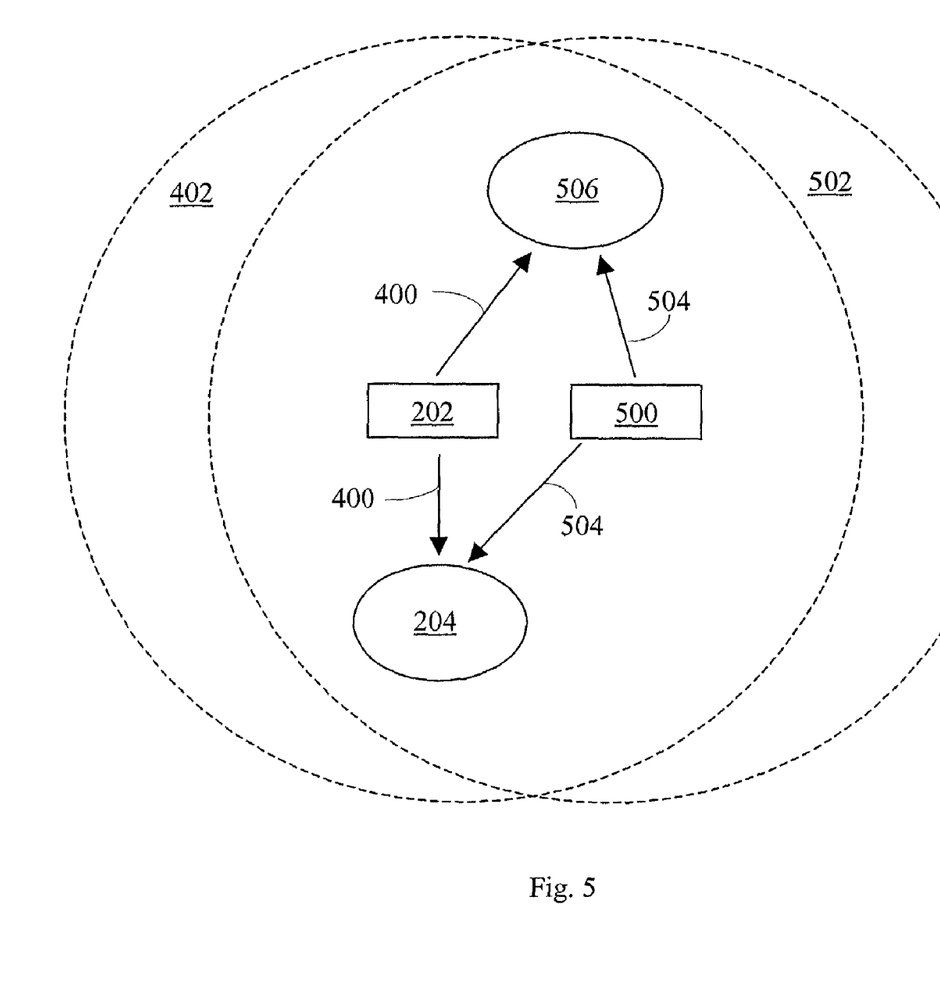
FIG. 5 shows an exemplary embodiment of an access point and a counterfeit access point sending beacon frames.

For instance, with reference to FIG. 5, a counterfeit AP 500 can obtain confidential information from a station 204 by posing as an authorized AP 202. More particularly, counterfeit AP 500 can transmit beacon frame 504 across a transmission range 502. Beacon frame 504 can include information such as frame type, beacon frame interval/rate, sequence number, timestamp, and the like. Stations 204 located within this transmission range 502 can detect beacon frame 504. After detecting beacon frame 504, station 204 can associate with counterfeit AP 500, without realizing that counterfeit AP 500 is not an authorized AP 202. Once associated with counterfeit AP 500, station 204 can transmit confidential information to counterfeit AP 500.

In order to avoid detection as a counterfeit AP, a counterfeit AP 500 can pose as an authorized AP 202. In particular, counterfeit AP 500 can determine information about authorized AP 202, such as the SSID for authorized AP 202, the MAC address for authorized AP 202, and the like. Counterfeit AP 500 can then be configured with the same SSID as authorized AP 202. In some applications, counterfeit AP 500 can obtain and use the MAC address of authorized AP 202. In addition, counterfeit AP 500 can locate itself near authorized AP 202 to avoid detection in the WLAN. In some applications, counterfeit AP 500 can transmit a stronger signal across the WLAN in order to entice stations 204 to associate with it instead of authorized AP 202.

Because counterfeit APs 500 can obtain confidential information from stations 204 by posing as authorized APs 202, counterfeit APs 500 can create unacceptable security problems in a WLAN. Accordingly, detecting counterfeit APs 500 in a WLAN can be used to improve security in the WLAN.

Figure 6:
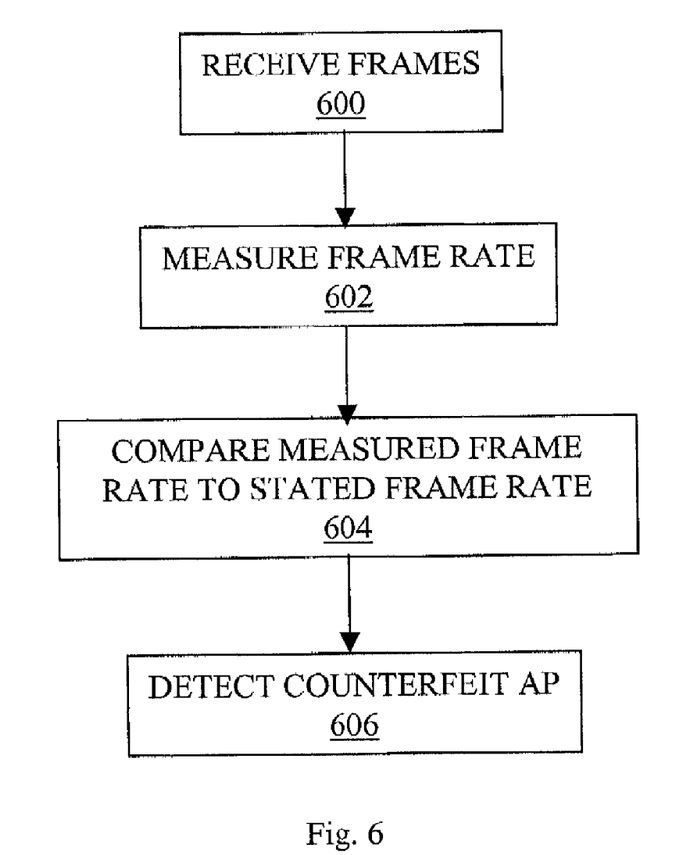
FIG. 6 shows an exemplary flow diagram of a process for detecting a counterfeit access point in a WLAN.

With reference to FIG. 6, an exemplary process for detecting a counterfeit AP is depicted. With reference to FIG. 5, assume for the sake of example that AP 202 is an authorized AP and that counterfeit AP 500 is an unauthorized AP attempting to pose as authorized AP 202. As described above, AP 202 sends beacon frames 400 and counterfeit AP 500 sends beacon frames 504 in an effort to associate with stations that would associate with authorized AP 202. As such, as also described above, beacon frames 504 can include similar information as beacon frames 400 in an effort to pose as beacon frames 400. For example, beacon frames 504 can have the same sender MAC address (i.e., the MAC address of authentic AP 202) and the same beacon frame rate.

In step 600 (FIG. 6) of the present exemplary process, detector 506 receives frames from APs having transmission ranges that include detector 506. As such, in the exemplary scenario depicted in FIG. 5, detector 506 receives beacon frames 400 and 504 from authorized AP 202 and unauthorized counterfeit AP 500, respectively.

In step 602 (FIG. 6), detector 506 measures the rate at which frames are received to determine a measured frame rate. For example, in one configuration, detector 506 can count the number of beacon frames received during a period of time. For the sake of example, assume that detector 506 counts a total of 100 beacon frames, which in the exemplary scenario depicted in FIG. 5 would include beacon frames 400 and 504, during a 5 second interval. As such, in this example, the measured beacon frame rate is 20 frames per second.

In step 604 (FIG. 6), detector 506 compares the measured frame rate to the stated frame rate. As described above, the stated frame rate can be obtained from the information provided in the frame itself. In the present example, assume that the stated beacon frame rate in beacon frame 400 is 10 frames per second. As described above, the measured frame rate is 20 frames per second.

In step 606 (FIG. 6), detector 506 determines if a counterfeit AP is detected based on the comparison of the measured frame rate to the stated frame rate. Again, in the present example, the measured frame rate is 20 frames per second and the stated frame rate is 10 frames per second. As such, in the present example, detector 506 determines that a counterfeit AP has been detected based on the difference in the measured frame rate and the stated frame rate.

Figure 7:
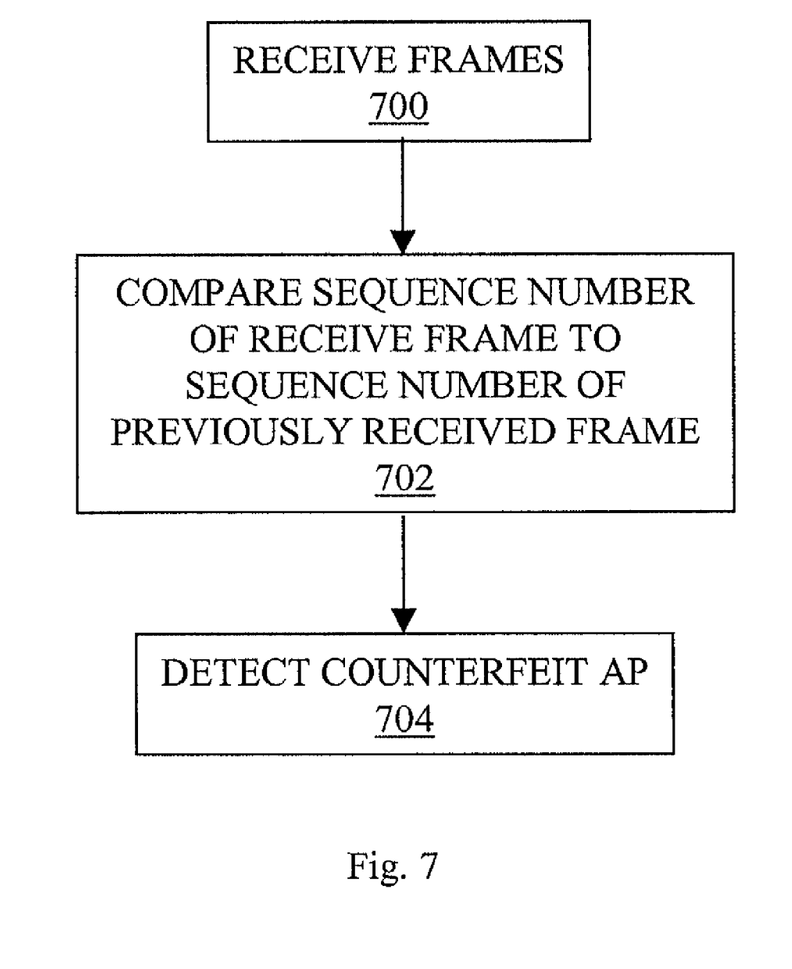
FIG. 7 shows another exemplary flow diagram of a process for detecting a counterfeit access point in a WLAN.

With reference now to FIG. 7, another exemplary process for detecting a counterfeit AP is depicted. With reference to FIG. 5, assume again that AP 202 is an authorized AP and that counterfeit AP 500 is an unauthorized AP attempting to pose as authorized AP 202. As also described above, unauthorized counterfeit AP 500 can obtain the MAC address of authorized AP 202. Counterfeit AP 500 can then use the MAC address of authorized AP 202 as the sender MAC address in beacon frames 504 in an effort to associate with stations that would associate with authorized AP 202.

In step 700 (FIG. 7) of the present exemplary process, detector 506 receives frames from APs having transmission ranges that include detector 506. As such, in the exemplary scenario depicted in FIG. 5, detector 506 receives beacon frames 400 and 504 from authorized AP 202 and unauthorized counterfeit AP 500, respectively.

In step 702 (FIG. 7), detector 506 compares the sequence number of a received frame to the sequence number of a previously received frame with the same sender MAC address. More specifically in the present example, when detector 506 receives a beacon frame, it determines the sender MAC address of the beacon frame. If the sender MAC address of the received beacon frame matches the sender MAC address of an authorized AP, detector 506 compares the sequence number of the received beacon frame to the sequence number of a previously received beacon frame from the same authorized AP, which was stored earlier.

In step 704 (FIG. 7), detector 506 determines if a counterfeit AP is detected based on the comparison of the sequence number of the received frame to the sequence number of a previously received frame. If the sequence number of the received frame is consistent with that of the previously received frame, then detector 506 saves the sequence number of the received frame as the sequence number of a previously received frame. However, if the sequence number of the received frame is not consistent with that of the previously received frame, then detector 506 determines that a counterfeit AP has been detected.

More particularly, in accordance with current IEEE 802.11 standard, APs send frames with sequence numbers that follow an incremental pattern. For instance, assume that authorized AP 202 sends beacon frames 400 having sequence numbers in ascending order such as 100, 101, 102, and the like.

Assume that detector 506 first receives beacon frame 400 having sequence number 100. As described above, when detector 506 receives beacon frame 400, it examines the sender MAC address of beacon frame 400 to confirm that the sender MAC address matches that of an authorized AP, which in this example is that of authorized AP 202.

Assume that beacon frame 400 having sequence number 100 is the first beacon frame received from AP 202. As such, because the sequence number of the received beacon frame 400 can not be compared to that of a previously received beacon frame 400, the sequence number of the received beacon frame 400 is stored as the new sequence number of a previously received beacon frame 400.

Now assume that detector 506 receives a beacon frame 504 from counterfeit AP 500, which is unauthorized and attempting to pose as authorized AP 202. Also assume that counterfeit AP 500 has sent beacon frame 504 using the sender MAC address of authorized AP 202. However, assume that the sequence number for beacon frame 504 sent by counterfeit AP 500 is 50. Accordingly, when detector 506 compares the sequence number of the received beacon frame, which in this example is 50, to the sequence number of the previously received beacon frame, which in this example is 100, they are not consistent. As such, detector 506 determines that a counterfeit AP 500 has been detected.

If detector 506 determines that the sequence number of the received frame and the sequence number of the previously received frame are consistent, then the sequence number of the received frame replaces the sequence number of the previously received frame, and the new sequence number is stored. For example, if the sequence number of the received frame is 101, then 506 stores 101 as the new sequence number of a previously received frame.

With reference to FIG. 5, the exemplary processes described above for detecting a counterfeit AP in a wireless local area network can be performed using software and/or hardware installed on a detector in the wireless local area network. In one embodiment, the detector is a station in the wireless local area network. Additionally, the station can be mobile, portable, stationary, and the like. For instance, the station can be a laptop computer, a personal digital assistant, and the like. In addition, the station can be used by a user as a diagnostic tool, by an administrator as an administrative tool, and the like, to assess the quality of communications in the WLAN.

One advantage of the present embodiment includes allowing the station to passively monitor the WLAN to detect a counterfeit AP. By passively monitoring the WLAN in this manner, the station can detect a counterfeit AP in the WLAN without burdening AP 202, consuming bandwidth, or interfering with traffic over the WLAN.

Although the present invention has been described with respect to certain embodiments, examples, and applications, it will be apparent to those skilled in the art that various modifications and changes may be made without departing from the invention.

We claim:

1. A method of detecting a counterfeit access point in a wireless local area network comprising:
   receiving beacon frames transmitted over the wireless local area network;
   examining a received beacon frame to obtain a stated beacon frame rate;
   determining a measured beacon frame rate; and
   comparing the measured beacon frame rate and the stated beacon frame rate to detect a counterfeit access point in the wireless local area network.

2. The method of claim 1, wherein a counterfeit access pint is detected if the measured beacon frame rate and the stated beacon frame rate are not consistent.

3. The method of claim 2, wherein a counterfeit access point is detected if the measured beacon frame rate and the stated beacon frame rate are different.

4. The method of claim 1, wherein determining a measured beacon frame rate comprises:
   counting the number of received beacon frames during a period of time.

5. The method of claim 1, wherein the beacon frames are received, the received beacon frame is examined, the measured beacon rate is determined, and the measured beacon frame rate and the stated beacon frame rate are compared at a detector connected to the wireless local area network.

6. The method of claim 5, wherein the detector is a station.

7. A method of detecting a counterfeit access point in a wireless local area network comprising:
   receiving a beacon frame transmitted over the wireless local area network,
      wherein the beacon frame includes a sequence numbe; and
   comparing the sequence number of the received beacon frame to a sequence number of a previously received beacon frame to detect a counterpart access point in the local area network.

8. The method of claim 7, wherein a counterfeit access point is detected if the sequence number of the received beacon frame and the sequence number of the previously received beacon frame are not sequential.

9. The method of claim 8 comprising:
   replacing the sequence number of the previously received beacon frame with the sequence number of the received beacon frame if the sequence number of the received beacon frame and the sequence number of the previously received beacon frame are sequential.

10. The method of claim 9 comprising:
    storing the sequence number of the previously received beacon frame after replacing the sequence number of the previously received beacon frame with the sequence number of the received beacon frame.

11. The method of claim 7, wherein the received beacon frame includes a medium access control (MAC) address, and wherein the sequence number of the previously received beacon frame is associated with a MAC address of the previously received beacon frame, and wherein comparing comprises:
    obtaining a sender MAC address of the received beacon frame; and
    comparing the sequence number of the received beacon frame to the sequence number of the previously beacon frame if the MAC address of the received beacon frame is the same as the MAC address of the previously received beacon frame.

12. A computer-readable storage medium containing computer executable code to detect a counterfeit access point in a wireless local area network by instructing the computer to operate as follows:
    receiving beacon frames transmitted over the wireless local area network at a station in the wireless local area network, and
    analyzing the received beacon frames at the station to detect a counterfeit access point in the wireless local area network, wherein analyzing comprises:
    obtaining a stated beacon frame rate from a received beacon frame;
    determining a measured beacon frame rate; and
    comparing the measured beacon frame rate and the stated beacon frame rate.

13. The computer-readable storage medium of claim 12, wherein determining a measured beacon frame rate comprises:
    counting the number of received beacon frames during a period of time.

14. A computer-readable storage medium containing computer executable code to detect a counterfeit access point in a wireless local area network by instructing the computer to operate as follows:
    receiving beacon frames transmitted over the wireless local area network at a station in the wireless local area network, and
    analyzing the received beacon frames at the station to detect a counterfeit access point in the wireless local area network, wherein analyzing comprises:
    obtaining a sequence number from a received beacon frame; and
    comparing the obtained sequence number to a sequence number of a previously received beacon frame.

15. The computer-readable storage medium of claim 14, wherein a counterfeit access point is detected if the obtained sequence number and the sequence number of the previously received beacon frame are not sequential.

16. The computer-readable storage medium of claim 14 comprising:
    replacing the sequence number of the previously received beacon frame with the obtained sequence number if the obtained sequence number and the sequence number of the previously received beacon frame are consistent.

17. The computer-readable storage medium of claim 14, wherein the sequence number of the previously received beacon frame is associated with a medium access control (MAC) address of the previously received beacon frame, and wherein analyzing comprises:
    obtaining a sender MAC address of the received beacon frame; and comparing the sequence number of the received beacon frame to the sequence number of the previously beacon frame if the obtained MAC address is the same as the MAC address associated with the sequence number of the previously received beacon frame.

18. A computer-readable storage medium containing computer executable code to detect a counterfeit access point in a wireless local area network by instructing the computer to operate as follows:
    obtaining received beacon frames transmitted over the wireless local area network;

examining a received beacon frame to obtain a stated beacon frame rate;

determining a measured beacon frame rate; and comparing the measured beacon frame rate and the stated beacon frame rate to detect a counterfeit access point in the wireless local area network.

19. The computer-readable storage medium of claim 18, wherein a counterfeit access point is detected if the measured beacon flame rate and the stated beacon frame rate are not consistent.

20. The computer-readable storage medium of claim 19, wherein a counterfeit access point is detected if the measured beacon frame rate and the stated beacon frame rate are different.

21. The computer-readable storage medium of claim 18, wherein determining a measured beacon frame rate comprises:

counting the number of received beacon frames during a period of time.

22. The computer-readable storage medium of claim 18, wherein the beacon frames are received, the received beacon frame is examined, the measured beacon rate is determined, and the measured beacon frame rate and the stated beacon frame rate are compared at a detector connected to the wireless local area network.

23. The computer-readable storage medium of claim 22, wherein the detector is a station.

24. A detector configured to detect a counterfeit access point in a wireless local area network, comprising:

an antenna configured to receive beam frames transmitted over the wireless local area network, a processor; and a computer-readable storage medium containing computer executable code to instruct the processor to operate as follows:

obtaining received beacon frames transmitted over the wireless local area network;

examining a received beacon frame to obtain a stated beacon frame rate;

determining a measured beacon frame rate; and comparing the measured beacon frame rate and the stated beacon frame rate to detect a counterfeit access point in the wireless local area network.

* * * * *